United States Patent
Ozaki et al.

(10) Patent No.: US 9,450,238 B2
(45) Date of Patent: Sep. 20, 2016

(54) HYDROGEN ABSORPTION ALLOY, HYDROGEN ABSORPTION ALLOY ELECTRODE, AND SECONDARY BATTERY

(75) Inventors: Tetsuya Ozaki, Kyoto (JP); Manabu Kanemoto, Kyoto (JP); Yoshiteru Kawabe, Kyoto (JP); Tadashi Kakeya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 508 days.

(21) Appl. No.: 13/580,587

(22) PCT Filed: Mar. 25, 2011

(86) PCT No.: PCT/JP2011/057304
§ 371 (c)(1),
(2), (4) Date: Aug. 22, 2012

(87) PCT Pub. No.: WO2011/122462
PCT Pub. Date: Oct. 6, 2011

(65) Prior Publication Data
US 2012/0315183 A1  Dec. 13, 2012

(30) Foreign Application Priority Data
Mar. 29, 2010 (JP) ................. 2010-074425

(51) Int. Cl.
| | |
|---|---|
| *C22C 19/03* | (2006.01) |
| *H01M 4/134* | (2010.01) |
| *H01M 4/38* | (2006.01) |
| *C01B 3/00* | (2006.01) |
| *C22C 1/04* | (2006.01) |
| *C22F 1/10* | (2006.01) |
| *H01M 10/34* | (2006.01) |

(52) U.S. Cl.
CPC ............ *H01M 4/383* (2013.01); *C01B 3/0047* (2013.01); *C01B 3/0057* (2013.01); *C22C 1/0441* (2013.01); *C22C 19/03* (2013.01); *C22F 1/10* (2013.01); *H01M 4/385* (2013.01); *H01M 10/345* (2013.01); *Y02E 60/124* (2013.01); *Y02E 60/327* (2013.01)

(58) Field of Classification Search
CPC .. H01M 4/383; H01M 4/385; H01M 10/345; C01B 3/0047; C01B 3/0057; C22C 1/0441; C22C 19/03; C22F 1/10; Y02E 60/124; Y02E 60/327
USPC ........................................................ 420/455
See application file for complete search history.

(56) References Cited

U.S. PATENT DOCUMENTS

| | | | |
|---|---|---|---|
| 6,703,164 B2 * | 3/2004 | Hayashida et al. ........ | 429/218.2 |
| 2009/0148770 A1 * | 6/2009 | Ozaki et al. ............... | 429/218.2 |

FOREIGN PATENT DOCUMENTS

| | | |
|---|---|---|
| JP | 11-323469 | 11/1999 |
| JP | 2008-71687 | 3/2008 |
| JP | 2008-163421 | 7/2008 |
| JP | 2009-68116 | 4/2009 |
| JP | 2009-108379 | 5/2009 |
| JP | 2011-044388 | 3/2011 |
| WO | 2009/060666 | 5/2009 |
| WO | 2009/060666 A1 | 5/2009 |

OTHER PUBLICATIONS

International Preliminary Report on Patentability and English Translation for International Application No. PCT/JP2011/057304, filed Mar. 25, 2011, Applicant—GS Yuasa International, Ltd., et al., 13 pages.
International Search Report dated May 24, 2011.

* cited by examiner

*Primary Examiner* — Jessee Roe
(74) *Attorney, Agent, or Firm* — Rankin, Hill & Clark LLP

(57) ABSTRACT

The present invention provides a hydrogen absorption alloy, which includes chemical composition represented by the general formula $M1_tM2_uM3_vCa_wMg_xNi_yM4_z$ wherein $16\times(d-1.870)/(d-r) \leq v \leq 16\times(d-1.860)/(d-r)$; $1.6 \leq w \leq 3.2$; $4.1 \leq x \leq 5.1$; $3.2 \leq (y+z)/(t+u+v+w+x) \leq 3.4$; $t+u+v+w+x+y+z=100$; M1 is one or more elements selected from La, Pr, and Nd; M2 is one or more elements selected from V, Nb, Ta, Ti, Zr, and Hf; M3 is one or more elements selected from Sm, Gd, Tb, Dy, Ho, Er, Tm, Yb, and Lu; M4 is one or more elements selected from Co, Mn, Al, Cu, Fe, Cr, and Zn; d is an average atomic radius of the elements selected as M1; and r is an average atomic radius of the elements selected as M3; and an electrode and a secondary battery using the same.

12 Claims, 2 Drawing Sheets

HYDROGEN ABSORPTION ALLOY, HYDROGEN ABSORPTION ALLOY ELECTRODE, AND SECONDARY BATTERY

TECHNICAL FIELD

The present invention relates to a hydrogen absorption alloy, a hydrogen absorption alloy electrode, and a secondary battery using the hydrogen absorption alloy electrode.

BACKGROUND ART

A hydrogen absorption alloy is an alloy that can stably and easily storage hydrogen as an energy source, and is receiving enormous attention as a new material for conversion and storage of energy.

Regarding application fields of the hydrogen absorption alloy as a functional material, there have been proposed a wide range of applications such as storage and/or transportation of hydrogen, storage and/or transportation of heat, conversion of energy between heat and a machine, separation and/or purification of hydrogen, separation of hydrogen isotopes, batteries with hydrogen as an active material, catalysts in synthetic chemical and temperature sensors.

For example, a nickel-metal hydride rechargeable battery using a hydrogen absorption alloy as a negative electrode material has advantages of (a) high capacity, (b) high resistance to overcharge and overdischarge, (c) being capable of high rate charge-discharge, (d) being clean and the like, and therefore receives attention as a consumer battery, and activities for its practicalization and application are vigorously conducted.

Thus, the hydrogen absorption alloy has potential for a variety of applications from mechanical, physical and chemical viewpoints, and is listed as one of key materials in future industries.

As electrode materials for a nickel-metal hydride rechargeable battery, which represents one application example of such a hydrogen absorption alloy, $AB_5$ type rare earth-Ni-based alloys having a $CaCu_5$ type crystal structure have been so far put into practical use, but these alloys reach the limit at a discharge capacity of about 300 mAh/g, and it is difficult to further increase the capacity.

In contrast, rare earth-Mg—Ni-based alloys, the capacity of which can be increased, have been receiving attention in recent years. These alloys have mutually different complicated layered structures, and are reported to show a discharge capacity greater than that of the $AB_5$ type alloy when used for electrodes, and expected as a next-generation negative electrode material for a nickel-metal hydride battery.

For improving cycle performance while retaining a high discharge capacity of such a rare earth-Mg—Ni-based alloy, the kind and amount of a metal that is further added to the hydrogen absorption alloy are adjusted (Patent Documents 1 to 4).

PRIOR ART DOCUMENTS

Patent Documents

Patent Document 1: JP 2008-71687 A
Patent Document 2: JP 2009-108379 A
Patent Document 3: JP 11-323469 A
Patent Document 4: JP 2009-68116 A

SUMMARY OF THE INVENTION

Problems to be Solved by the Invention

However, a hydrogen absorption alloy which satisfies adequate cycle performance has not been obtained yet in the prior arts described above.

Thus, it is an object of the present invention to provide a hydrogen absorption alloy having excellent cycle performance while retaining a high discharge capacity when formed into an electrode.

Also, it is an object of the present invention to provide a hydrogen absorption alloy electrode and a secondary battery, which have a high discharge capacity and the capacity retention ratio of which is hard to be reduced even when charge-discharge is repeated.

Means for Solving the Problems

For solving the above-mentioned problems, the present inventors have found that a hydrogen absorption alloy according to the present invention has chemical composition represented by the general formula $M1_tM2_uM3_vCa_wMg_xNi_yM4_z$ wherein $16\times(d-1.870)/(d-r) \le v \le 16\times(d-1.860)/(d-r)$;
$1.6 \le w \le 3.2$;
$4.1 \le x \le 5.1$;
$3.2 \le (y+z)/(t+u+v+w+x) \le 3.4$;
$t+u+v+w+x+y+z=100$;
M1 is one or more elements selected from La, Pr, and Nd;
M2 is one or more elements selected from V, Nb, Ta, Ti, Zr, and Hf;
M3 is one or more elements selected from Sm, Gd, Tb, Dy, Ho, Er, Tm, Yb, and Lu;
M4 is one or more elements selected from Co, Mn, Al, Cu, Fe, Cr, and Zn;
d is an average atomic radius of the elements selected as M1; and
r is an average atomic radius of the elements selected as M3.

It is to be noted that the values used as atomic radii in the present invention refer to values of atomic radii described in "Compilation of calculated data useful in predicting metallurgical behavior of the elements in binary alloy systems" [Teatum, E., and two others, LA-2345, Los Alamos Scientific Laboratory, published in 1960].

A hydrogen absorption alloy according to the present invention has chemical composition represented by the general formula $M1_tM2_uM3_vCa_wMg_xNi_yM4_zM5_s$ wherein $16\times(d-1.870)/(d-r) \le v \le 16\times(d-1.860)/(d-r)$;
$1.6 \le w \le 3.2$;
$4.1 \le x \le 5.1$;
$3.2\ (y+z)/(t+u+v+w+x) \le 3.4$;
$t+u+v+w+x+y+z=100$;
s is in a range of $0 \le s \le 0.4$;
M1 is one or more elements selected from La, Pr, and Nd;
M2 is one or more elements selected from V, Nb, Ta, Ti, Zr, and Hf;
M3 is one or more elements selected from Sm, Gd, Tb, Dy, Ho, Er, Tm, Yb, and Lu;
M4 is one or more elements selected from Co, Mn, Al, Cu, Fe, Cr, and Zn;
M5 is an element other than M1, M2, M3 and M4;
d is an average atomic radius of the elements selected as M1; and
r is an average atomic radius of the elements selected as M3.

Further, the hydrogen absorption alloy of the present invention is preferably constituted such that v satisfies $0.5 \leq v \leq 3.7$.

Further, the hydrogen absorption alloy of the present invention is preferably constituted such that v satisfies $1.6 \leq v \leq 3.5$.

Further, the hydrogen absorption alloy of the present invention is preferably such that M3 includes Sm.

Further, the hydrogen absorption alloy of the present invention is preferably such that M3 is Sm.

Also, the hydrogen absorption alloy of the present invention is preferably such that a crystal phase having a $Ce_2Ni_7$ type crystal structure is a main generated phase.

Further, the present invention provides a hydrogen absorption alloy electrode using the above-mentioned hydrogen absorption alloy as a hydrogen storage medium.

Also, the present invention provides a secondary battery including a negative electrode containing the above-mentioned hydrogen absorption alloy.

ADVANTAGES OF THE INVENTION

The hydrogen absorption alloy according to the present invention is a hydrogen absorption alloy having the aforementioned chemical composition, and therefore has such extremely excellent properties that the retention rate of a hydrogen absorption capacity is high even when absorption and discharge of hydrogen is repeated, and also the hydrogen absorption amount is high.

Also, by including such a novel hydrogen absorption alloy, the secondary battery according to the present invention is a secondary battery having a high discharge capacity and such an excellent cycle characteristic that the capacity retention ratio is hard to be reduced even when charge-discharge is repeated.

MODE FOR CARRYING OUT THE INVENTION

Figure 1:
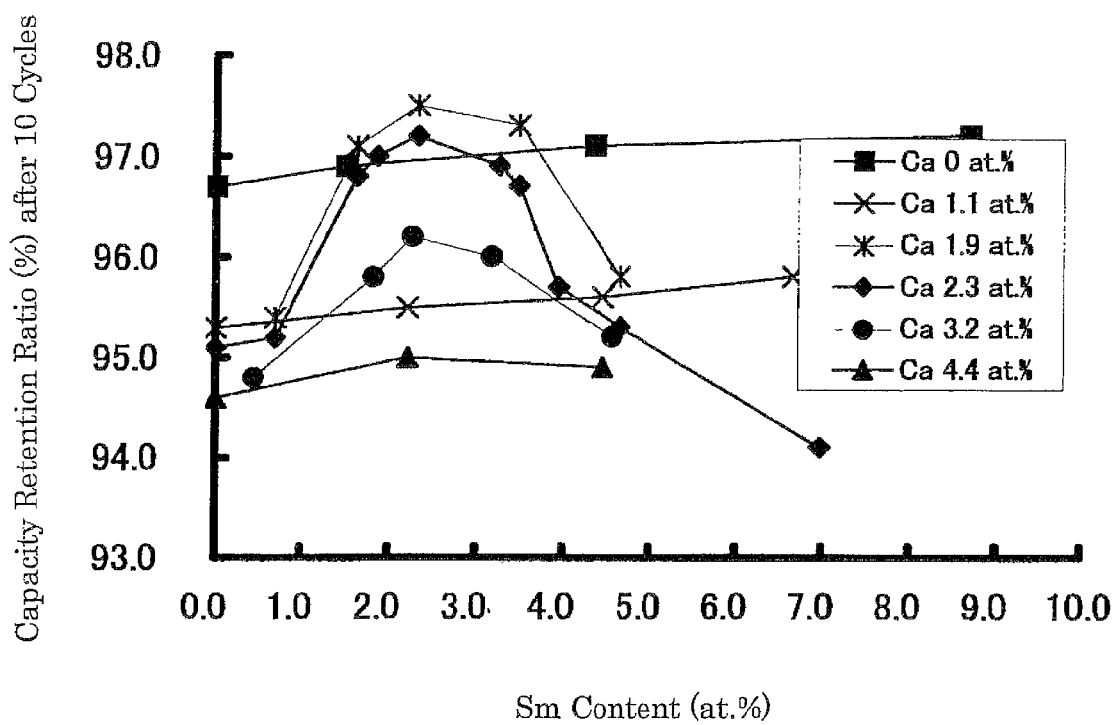
FIG. 1 is a graph showing a relation between the content ratio of Sm and the capacity retention ratio (%) of a battery at each Ca content ratio in a hydrogen absorption alloy.

Hereinbelow, an embodiment of a hydrogen absorption alloy according to the present invention will be described.

The hydrogen absorption alloy of this embodiment is an alloy having chemical composition represented by the general formula $M1_t M2_u M3_v Ca_w Mg_x Ni_y M4_z$ and being included particularly in hydrogen absorption alloys referred to as rare earth-Ca—Mg—Ni-based alloys among those referred to generally as rare earth-Mg—Ni-based alloys.

Here, M1 is one or more elements selected from La, Pr, and Nd; M2 is one or more elements selected from V, Nb, Ta, Ti, Zr, and Hf; M3 is one or more elements selected from Sm, Gd, Tb, Dy, Ho, Er, Tm, Yb, and Lu; and M4 is one or more elements selected from Co, Mn, Al, Cu, Fe, Cr, and Zn.

At this time, if an average atomic radius of the elements selected as M1 is defined as d and an average atomic radius of the elements selected as M3 is defined as r, the ratio v of M3 satisfies $16 \times (d-1.870)/(d-r) \leq v \leq 16 \times (d-1.860)/(d-r)$, the ratio of Ca satisfies $1.6 \leq w \leq 3.2$, the ratio of Mg satisfies $4.1 \leq x \leq 5.1$ and the ratio of each component satisfies the requirement of $3.2 \leq (y+z)/(t+u+v+w+x) \leq 3.4$ and $t+u+v+w+x+y+z=100$.

It is to be noted that the unit of each of the average atomic radii d and r is $10^{-10}$ m.

It is to be noted that if v, the ratio of M3, satisfies $16 \times (d-1.870)/(d-r) \leq v \leq 16 \times (d-1.860)/(d-r)$, namely the relation between the atomic radii of metals selected as M1 and metals selected as M3 and the ratio of M3 satisfies the formula described above, an a-axial length in a $Ce_2Ni_7$ type crystal structure (2:7 H) that is a main generated phase (or $Gd_2Co_7$ type crystal structure (2:7 R)) is in a range of 5.023 Å to 5.033 Å.

When the a-axial length falls within this range, the hydrogen absorption alloy of this embodiment has especially remarkably improved cycle performance.

Specifically, the range of the ratio v of M3 satisfies $0.5 \leq v \leq 3.7$, and preferably satisfies $1.6 \leq v \leq 3.5$.

All the metal elements as M3, i.e., Sm, Gd, Tb, Dy, Ho, Er, Tm, Yb and Lu, are in a relation in which the a-axial length is in a range of 5.023 Å to 5.033 Å if their content ratio satisfies the formula described above. This results from existence of a linear relation between the average atomic radius of all the rare earths including M1 and M3 and the a-axial length. When M3 is contained as a metal with which a part of the rare earth M1 is substituted in the hydrogen absorption alloy of this embodiment, the effect of remarkable improvement of cycle performance can be exhibited.

However, the content ratio of M3 varies depending on an element. For example, when La is employed as M1, v=1.6 to 3.5 if M3=Sm, v=1.6 to 3.5 if M3=Gd, v=1.3 to 2.8 if M3=Tb, v=1.2 to 2.6 if M3=Dy, v=1.1 to 2.4 if M3=Ho, v=1.0 to 2.2 if M3=Er, v=0.9 to 2.0 if M3=Tm, v=0.9 to 1.9 if M3=Yb, and v=0.9 to 1.9 if M3=Lu.

In the hydrogen absorption alloy of this embodiment, a B/A ratio, wherein A is the sum of the ratio t of M1, the ratio u of M2, the ratio v of M3, the ratio w of calcium Ca and the ratio x of magnesium (t+u+v+w+x) and B is the sum of the ratio y of nickel Ni and the ratio z of M4 (y+z), is in a range of 3.2 or more and 3.4 or less, and this range is a range at which a crystal phase having a $Ce_2Ni_7$ type crystal structure as described later is stable.

In the hydrogen absorption alloy of this embodiment, the ratio x of magnesium Mg is in a range of 4.1 to 5.1 atom %.

If the ratio of Mg is in this range, when an alloy is ground, the alloy is suppressed to be formed into microparticles, and cycle performance is improved.

The ratio t of M1 contained in the hydrogen absorption alloy of this embodiment is preferably in a range of 13.9 to 14.5 atom %, the ratio u of M2 is in a range of 0 to 0.7 atomic %, and the ratio z of M4 is preferably in a range of 0 to 0.8 atomic %. Further, the ratio y of Ni is preferably in a range of 75.0 to 77.0 atomic %. If these ranges are satisfied, cycle performance can be further improved.

It is to be noted that V, Nb, Ta, Ti, Zr and Hf as M2 each are a metal element belonging to group 4A or 5A. These metal elements have such a common property as to easily form a hydride and hardly dissolve in a $Ce_2Ni_7$ type crystal structure phase and a $Gd_2Co_7$ type crystal structure phase.

In a hydrogen absorption alloy including the novel composition described above, cycle performance is improved while retaining a high hydrogen absorption property.

If M3 is Sm, namely in an alloy in which a part of the rare earth of a rare earth-Ca—Mg—Ni-based alloy is substituted with Sm, cycle performance is remarkably improved.

The ratio of Sm, in this case, is preferably $1.6 \leq v \leq 3.5$.

If the ratio of Sm is in this range, a crystal phase having a $Ce_2Ni_7$ type crystal structure as described later is stable and the effect of improvement of cycle performance by substitution with Sm is exhibited.

Further, the optimum amount of Sm contained in the alloy also relates to the amount of Ca in the alloy.

If the ratio of Sm to the entire hydrogen absorption alloy is 1.6 atomic % or more and 3.5 atomic % or less, and the ratio of Ca is 1.6 atomic % or more and 3.2 atomic % or less, the effect of remarkable improvement of cycle performance in a secondary battery, such as a nickel-metal hydride rechargeable battery, using such a hydrogen absorption alloy as an electrode is recognized.

Furthermore, by allowing the ratio of Ca to fall within this range, corrosion of the hydrogen absorption alloy is suppressed and a high capacity can be retained.

The reason why the durability of a conventional rare earth-Ca—Mg—Ni-based alloy is not satisfactory is presumed that it is due to the structure of a crystal phase possessed by this type of alloy.

That is, this type of alloy has a crystal structure, in which units having different lattice sizes, i.e., a Laves type $A_2B_4$ unit and a $CaCu_5$ type $AB_5$ unit, are laminated, and it is conceived that there arises a large difference in volume change between both phase units when absorption and discharge of hydrogen is repeated, and therefore the capacity is reduced due to occurrence of distortion at the boundary interface of both phases.

In such a type of alloy, a reduction in capacity is suppressed when Sm is added in an amount within the above-mentioned range. This is conceived to be because the atomic radius of Sm is small in comparison with those of rare earths such as La, Pr and Nd, and therefore sites of the rare earth of the $A_2B_4$ unit, which are susceptible to entrance of small atoms, are selectively occupied, so that a difference in lattice size is reduced, and distortion is hard to occur even when absorption and discharge of hydrogen is repeated, thus improving the durability of the hydrogen absorption alloy.

It is to be noted that the $A_2B_4$ unit is a structure unit having a hexagonal crystal $MgZn_2$ type crystal structure (C14 structure) or a hexagonal crystal $MgCu_2$ type crystal structure (C15 structure), and the $AB_5$ unit is a structure unit having a hexagonal crystal $CaCu_5$ type crystal structure.

Also, the hydrogen absorption alloy of this embodiment is preferably such that a crystal phase having a $Ce_2Ni_7$ type crystal structure is a main generated phase. Such a configuration enables retention of a high capacity and further improvement of cycle performance. This is conceived to result from easy dissolution of Ca in a crystal structure.

Here, the crystal phase having a $Ce_2Ni_7$ type crystal structure is a crystal structure in which two $AB_5$ units are inserted between $A_2B_4$ units.

It is to be noted that the $Ce_2Ni_7$ type crystal structure being a main generated phase means that the $Ce_2Ni_7$ type crystal structure exists in an amount larger than that of a phase composed of any other structure, which is contained in an alloy, for example a phase composed of a $Gd_2Co_7$ type crystal structure.

The amount of a phase composed of a $Ce_2Ni_7$ type crystal structure, which is contained in an alloy, is preferably 44 mass % or more.

If the ratio, at which the phase composed of a $Ce_2Ni_7$ type crystal structure is contained, is within the above-mentioned range, excellent cycle performance is shown while retaining a high capacity.

The crystal structure can be specified by, for example, making an X-ray diffraction measurement of a ground alloy powder and analyzing the obtained diffraction pattern by the Rietveld method.

Further, the hydrogen absorption alloy of this embodiment is preferably such that an a-axial length of the crystal phase is 5.023 to 5.033 Å. If the a-axial length is within the range of 5.023 to 5.033 Å, cycle performance can be improved while retaining a high capacity.

It is to be noted that the a-axial length can be calculated from an X-ray diffraction pattern.

The hydrogen absorption alloy according to the present invention is not limited to those described above. That is, various forms employed in general hydrogen absorption alloys can be employed within the range of not impairing the effect of the present invention.

For example, the hydrogen absorption alloy shown in the embodiment can include elements that are not defined by the general formula $M1_tM2_uM3_vCa_wMg_xNi_yM4_z$ within the range of not impairing the effect of the present invention.

Examples thereof include hydrogen absorption alloys including chemical composition represented by the general formula $M1_tM2_uM3_vCa_wMg_xNi_yM4_zM5_s$ wherein $16\times(d-1.870)/(d-r) \leq v \leq 16\times(d-1.860)/(d-r)$;

$1.6 \leq w \leq 3.2$;

$4.1 \leq x \leq 5.1$;

$3.2 \leq (y+z)/(t+u+v+w+x) \leq 3.4$;

$t+u+v+w+x+y+z=100$;

s is in a range of $0 \leq s \leq 0.4$;

M1 is one or more elements selected from La, Pr, and Nd;

M2 is one or more elements selected from V, Nb, Ta, Ti, Zr, and Hf;

M3 is one or more elements selected from Sm, Gd, Tb, Dy, Ho, Er, Tm, Yb, and Lu;

M4 is one or more elements selected from Co, Mn, Al, Cu, Fe, Cr, and Zn;

M5 is an element other than M1, M2, M3 and M4;

d is an average atomic radius of the elements selected as M1; and r is an average atomic radius of the elements selected as M3.

The content s of M5 is an amount that is within the range of not impairing the effect of the present invention. That is, the effect of the present invention is not impaired if the content s of M5 is an amount that satisfies $0 < s \leq 0.4$ as described above.

The reason why M5 is contained is that impurities are contained in a raw material ingot.

Therefore, the amount of M5 in the hydrogen absorption alloy can be controlled by controlling the purity of a raw material ingot.

The hydrogen absorption alloy can be produced by a known method for producing a hydrogen absorption alloy.

For example, first a raw material powder of an alloy is weighed to a predetermined amount based on the chemical composition of an intended hydrogen absorption alloy, and placed in a reaction vessel, and the raw material powder is melted using a high-frequency melting furnace in an inert gas atmosphere under reduced or normal pressure, and then solidified by rapid cooling at a cooling rate of 1000° C./second for increasing the generation rate of a semi-stable phase. By further carrying out annealing at 860 to 1000° C. for 3 to 50 hours under an inert gas atmosphere in a pressurized state, the alloy can be generated with high efficiency.

The atmosphere and temperature condition in melting and annealing can be appropriately adjusted according to alloy composition. As a cooling method, a melt spinning method, a gas atomizing method, a water-cooled metal mold casting method, a method of solidification by rapid cooling on a water-cooled plate, or the like can be preferably used.

When annealing is carried out in an inert gas atmosphere, it is preferably carried out in an inert gas atmosphere (e.g., argon gas, helium gas) pressurized to 0.1 MPa (gage pressure) or higher, and thereby evaporation of an alloy such as Mg from an alloy under heat treatment can be prevented.

Helium gas is preferably used as the inert gas, and preferable is 0.2 to 1.0 MPa (gage pressure) as the pressure condition.

Helium has excellent thermal conductivity in comparison with argon, so that a temperature difference within a baking furnace is reduced and an alloy can be heat-treated at a more uniform temperature. Owing to such a heat treatment at a uniform temperature, evaporation of an alloy such as, for example, Mg can be effectively prevented to prepare an alloy having desired composition and a phase without causing the alloy weight to vary.

The alloy is pulverized as required, the obtained powder is then mixed with an appropriate binder (e.g., resin such as polyvinyl alcohol) and water (or other liquid) and thereby formed into a paste, and the paste is filled in a nickel porous body, dried, and then pressure-molded into a desired electrode pattern, whereby a negative electrode, which can be used for a secondary battery such as a nickel-metal hydride battery, can be produced.

The negative electrode prepared as described above is combined with a positive electrode (e.g., nickel electrode), an alkaline electrolyte solution and the like to prepare a secondary battery (e.g., nickel-metal hydride battery) according to the present invention.

EXAMPLES

Hereinbelow, the present invention will be further specifically described with reference to examples and comparative examples, but the present invention is not limited to the examples below.

Raw material ingots were each weighed to a predetermined amount so that the atomic % ratios of elements of a hydrogen absorption alloy would be those shown in Table 1, placed in a crucible, and heated to 1500° C. using a high-frequency melting furnace in an argon gas atmosphere under reduced pressure to melt the material. Subsequently, the molten material was transferred to a water-cooled mold in the high-frequency melting furnace to solidify the material. Further, the obtained alloy was annealed at 910° C. under a helium gas atmosphere pressurized to 0.2 MPa (gage pressure, the same applies hereinbelow) to thereby obtain a hydrogen absorption alloy of each of examples and comparative examples.

The obtained hydrogen absorption alloy was mechanically ground by a grinder under an argon gas atmosphere, and adjusted so that the average particle diameter (D50) was 50 μm.

(Measurement of Charge-Discharge Properties)
(a) Preparation of Electrode
To 100 parts by weight of the obtained hydrogen absorption alloy powder of example or comparative example, 3 parts by weight of a nickel powder (manufactured by Inco Limited; #210) was added and the resultant was mixed, an aqueous solution having a thickener (methyl cellulose) dissolved therein was then added, 1.5 parts by weight of a binder (styrene butadiene rubber) was further added, a paste thus obtained was coated on both surfaces of a perforation steel plate (opening ratio of 50%) having a thickness of 45 μm and dried, and the resulting laminate was then pressed to have a thickness of 0.36 mm to form a negative electrode.

On the other hand, a sinter type nickel hydroxide electrode was used as a positive electrode.

(b) Preparation of Open Type Battery
The negative electrode prepared as described above was held by a positive electrode with a separator interposed therebetween, fixed with a bolt so that a pressure of 1 kgf/cm$^2$ was applied to these electrodes, and thus assembled into an open type cell. A 6.8 mol/L KOH solution was used as an electrolyte solution.

(c) Measurement of Maximum Discharge Capacity
The prepared battery was placed in a water bath at 20° C., charge-discharge was repeated in 10 cycles under conditions of charge: 150% at 0.1 C and discharge: final voltage −0.6 V (vs. Hg/HgO) at 0.2 ItA, and a point, at which the discharge capacity became maximum, was designated as a maximum discharge capacity.

(d) Measurement of Capacity Retention Ratio
Subsequently to the measurement of a maximum discharge capacity, charge-discharge in 1 to 9 cycles was carried out under conditions of charge: 150% at 0.1 C and discharge: final voltage −0.6 V (vs. Hg/HgO) at 1.0 ItA, followed by returning back to conditions of final voltage −0.6 V (vs. Hg/HgO) at 0.2 ItA and measuring a discharge capacity in the tenth cycle.

Subsequently, a capacity retention ratio (capacity retention ratio (%) after 10 cycles) was determined from the measured maximum discharge capacity up to the tenth cycle and maximum discharge capacity in the tenth cycle.

(e) Measurement of Crystal Structure
The powder of the alloy of each of examples and comparative examples was subjected to an X-ray diffraction measurement using an X-ray diffractometer to measure the content of each generated phase.

Specifically, the obtained hydrogen absorption alloy of each of examples and comparative examples was ground, followed by making a measurement under conditions of gonio-radius: 185 mm, divergence slit: 1 deg., scattering slit: 1 deg., light receiving slit: 0.15 mm, X-ray source: CuKα ray, tube voltage: 50 kV and tube current: 200 mA using a powder X-ray diffractometer (manufactured by Rigaku Corporation; RINT 2400).

It is to be noted that the diffraction angle was in a range of 2θ=15.0 to 85.0°, and the scan speed was 4.000°/minute, and the scan step was 0.020°.

The crystal structure was analyzed by the Rietveld method (using analysis software: RIETAN 2000) based on the obtained X-ray diffraction result.

The results are collectively shown in Table 1.

TABLE 1

| | at % | | | | | | | | | | | | | Abundance | |
| | M1 | | | | | M3 | | M2 | | | M4 | | | B/A | ratio (mass %) | |
| | La | Pr | Nd | Sm | Dy | Zr | Nb | Ca | Mg | Ni | Co | Mn | Al | ratio | Ce$_2$Ni$_7$ | Gd2Cp7 |
| Example 1 | 13.3 | 0.0 | 0.0 | 2.3 | 0.0 | 0.7 | 0.0 | 2.3 | 4.7 | 76.7 | 0.0 | 0.0 | 0.0 | 3.3 | 71.3 | 20.9 |
| Example 2 | 14.4 | 0.0 | 0.0 | 1.9 | 0.0 | 0.0 | 0.0 | 2.3 | 4.7 | 76.7 | 0.0 | 0.0 | 0.0 | 3.3 | 78.3 | 11.2 |

TABLE 1-continued

| | | | | | | | | | | | | | | | | |
|---|---|---|---|---|---|---|---|---|---|---|---|---|---|---|---|---|
| Example 3 | 12.8 | 0.0 | 0.0 | 3.5 | 0.0 | 0.0 | 0.0 | 2.3 | 4.7 | 76.7 | 0.0 | 0.0 | 0.0 | 3.3 | 45.3 | 32.8 |
| Example 4 | 13.0 | 0.0 | 0.0 | 3.3 | 0.0 | 0.0 | 0.0 | 2.3 | 4.7 | 76.0 | 0.5 | 0.0 | 0.2 | 3.3 | 53.2 | 28.1 |
| Example 5 | 15.1 | 0.0 | 0.0 | 1.6 | 0.0 | 0.0 | 0.0 | 1.9 | 4.7 | 76.0 | 0.0 | 0.2 | 0.5 | 3.3 | 70.6 | 15.8 |
| Example 6 | 14.7 | 0.0 | 0.0 | 1.6 | 0.0 | 0.0 | 0.0 | 2.3 | 4.7 | 76.5 | 0.0 | 0.0 | 0.2 | 3.3 | 74.7 | 5.8 |
| Example 7 | 14.4 | 0.0 | 0.0 | 2.3 | 0.0 | 0.0 | 0.0 | 1.9 | 4.7 | 76.5 | 0.0 | 0.0 | 0.2 | 3.3 | 65.8 | 18.6 |
| Example 8 | 13.3 | 0.0 | 0.0 | 3.5 | 0.0 | 0.0 | 0.0 | 1.9 | 4.7 | 76.5 | 0.0 | 0.0 | 0.2 | 3.3 | 48.1 | 27.3 |
| Example 9 | 12.7 | 0.0 | 0.0 | 2.3 | 0.0 | 0.0 | 0.0 | 3.2 | 4.5 | 77.0 | 0.0 | 0.0 | 0.2 | 3.4 | 48.2 | 21.4 |
| Example 10 | 13.2 | 0.0 | 0.0 | 1.8 | 0.0 | 0.0 | 0.0 | 3.2 | 4.5 | 76.6 | 0.0 | 0.0 | 0.7 | 3.4 | 54.3 | 18.7 |
| Example 11 | 11.8 | 0.0 | 0.0 | 3.2 | 0.0 | 0.0 | 0.0 | 3.2 | 4.5 | 77.0 | 0.0 | 0.0 | 0.2 | 3.4 | 44.2 | 31.8 |
| Example 12 | 12.8 | 1.2 | 0.0 | 2.3 | 0.0 | 0.0 | 0.0 | 2.3 | 4.7 | 76.7 | 0.0 | 0.0 | 0.0 | 3.3 | 75.8 | 18.0 |
| Example 13 | 13.3 | 0.0 | 1.6 | 1.9 | 0.0 | 0.0 | 0.0 | 1.9 | 4.7 | 76.7 | 0.0 | 0.0 | 0.0 | 3.3 | 64.8 | 21.3 |
| Example 14 | 14.4 | 0.0 | 0.0 | 0.0 | 1.9 | 0.0 | 0.0 | 2.3 | 4.7 | 76.7 | 0.0 | 0.0 | 0.0 | 3.3 | 42.8 | 35.8 |
| Example 15 | 13.3 | 0.0 | 0.0 | 2.3 | 0.0 | 0.0 | 0.7 | 2.3 | 4.7 | 76.7 | 0.0 | 0.0 | 0.0 | 3.3 | 69.1 | 22.6 |
| Comparative Example 1 | 12.3 | 0.0 | 0.0 | 4.0 | 0.0 | 0.0 | 0.0 | 2.3 | 4.7 | 76.0 | 0.0 | 0.0 | 0.7 | 3.3 | 21.8 | 37.2 |
| Comparative Example 2 | 13.7 | 0.0 | 0.0 | 0.9 | 0.0 | 0.0 | 0.0 | 1.6 | 4.7 | 78.8 | 0.0 | 0.0 | 0.2 | 3.8 | 82.1 | 0.0 |
| Comparative Example 3 | 16.3 | 0.0 | 0.0 | 0.0 | 0.0 | 0.0 | 0.0 | 2.3 | 4.7 | 76.7 | 0.0 | 0.0 | 0.0 | 3.3 | 80.6 | 0.0 |
| Comparative Example 4 | 9.3 | 0.0 | 0.0 | 7.0 | 0.0 | 0.0 | 0.0 | 2.3 | 4.7 | 76.7 | 0.0 | 0.0 | 0.0 | 3.3 | 0.0 | 50.2 |
| Comparative Example 5 | 11.6 | 0.0 | 0.0 | 4.7 | 0.0 | 0.0 | 0.0 | 2.3 | 4.7 | 76.7 | 0.0 | 0.0 | 0.0 | 3.3 | 10.7 | 43.9 |
| Comparative Example 6 | 18.3 | 0.0 | 0.0 | 0.0 | 0.0 | 0.0 | 0.0 | 0.0 | 3.5 | 75.0 | 0.0 | 0.0 | 1.1 | 2.2 | 3.6 | 26.0 | 0.0 |
| Comparative Example 7 | 16.7 | 0.0 | 0.0 | 1.5 | 0.0 | 0.0 | 0.0 | 0.0 | 3.5 | 75.0 | 0.0 | 0.0 | 1.1 | 2.2 | 3.6 | 33.8 | 0.0 |
| Comparative Example 8 | 13.9 | 0.0 | 0.0 | 4.3 | 0.0 | 0.0 | 0.0 | 0.0 | 3.5 | 75.0 | 0.0 | 0.0 | 1.1 | 2.2 | 3.6 | 48.0 | 0.0 |
| Comparative Example 9 | 9.6 | 0.0 | 0.0 | 8.7 | 0.0 | 0.0 | 0.0 | 0.0 | 3.5 | 75.0 | 0.0 | 0.0 | 1.1 | 2.2 | 3.6 | 56.9 | 0.0 |
| Comparative Example 10 | 12.2 | 1.1 | 0.0 | 0.0 | 0.0 | 0.0 | 0.0 | 4.4 | 4.4 | 77.8 | 0.0 | 0.0 | 0.0 | 3.5 | 0.0 | 77.2 |
| Comparative Example 11 | 10.0 | 1.1 | 0.0 | 2.2 | 0.0 | 0.0 | 0.0 | 4.4 | 4.4 | 77.8 | 0.0 | 0.0 | 0.0 | 3.5 | 0.0 | 54.5 |
| Comparative Example 12 | 7.8 | 1.1 | 0.0 | 4.4 | 0.0 | 0.0 | 0.0 | 4.4 | 4.4 | 77.8 | 0.0 | 0.0 | 0.0 | 3.5 | 0.0 | 84.7 |
| Comparative Example 13 | 14.4 | 0.0 | 2.2 | 0.0 | 0.0 | 0.0 | 0.0 | 1.1 | 4.4 | 77.8 | 0.0 | 0.0 | 0.0 | 3.5 | 62.7 | 7.1 |
| Comparative Example 14 | 12.2 | 0.0 | 2.2 | 2.2 | 0.0 | 0.0 | 0.0 | 1.1 | 4.4 | 77.8 | 0.0 | 0.0 | 0.0 | 3.5 | 58.3 | 12.1 |
| Comparative Example 15 | 10.0 | 0.0 | 2.2 | 4.4 | 0.0 | 0.0 | 0.0 | 1.1 | 4.4 | 77.8 | 0.0 | 0.0 | 0.0 | 3.5 | 35.0 | 15.4 |
| Comparative Example 16 | 7.8 | 0.0 | 2.2 | 6.7 | 0.0 | 0.0 | 0.0 | 1.1 | 4.4 | 77.8 | 0.0 | 0.0 | 0.0 | 3.5 | 31.0 | 13.2 |
| Comparative Example 17 | 15.6 | 0.0 | 0.0 | 0.7 | 0.0 | 0.0 | 0.0 | 2.3 | 4.7 | 76.7 | 0.0 | 0.0 | 0.0 | 3.3 | 78.5 | 0.0 |
| Comparative Example 18 | 12.1 | 0.0 | 0.0 | 4.7 | 0.0 | 0.0 | 0.0 | 1.9 | 4.7 | 76.5 | 0.0 | 0.0 | 0.2 | 3.3 | 12.6 | 48.5 |
| Comparative Example 19 | 16.0 | 0.0 | 0.0 | 0.7 | 0.0 | 0.0 | 0.0 | 1.9 | 4.7 | 76.5 | 0.0 | 0.0 | 0.2 | 3.3 | 80.2 | 0.0 |
| Comparative Example 20 | 14.5 | 0.0 | 0.0 | 0.5 | 0.0 | 0.0 | 0.0 | 3.2 | 4.5 | 77.0 | 0.0 | 0.0 | 0.2 | 3.4 | 66.3 | 5.4 |
| Comparative Example 21 | 10.5 | 0.0 | 0.0 | 4.5 | 0.0 | 0.0 | 0.0 | 3.2 | 4.5 | 77.0 | 0.0 | 0.0 | 0.2 | 3.4 | 5.8 | 49.1 |
| Comparative Example 22 | 14.6 | 0.0 | 0.0 | 2.4 | 0.0 | 0.0 | 0.0 | 2.4 | 4.9 | 75.6 | 0.0 | 0.0 | 0.0 | 3.1 | 0.0 | 15.8 |
| Comparative Example 23 | 12.8 | 0.0 | 0.0 | 2.3 | 0.0 | 0.0 | 0.0 | 2.3 | 5.8 | 76.7 | 0.0 | 0.0 | 0.0 | 3.3 | 0.0 | 85.5 |

| | Abundance ratio (mass %) | | | | | a-axial length (Å) of main phase | Maximum discharge capacity (mAh/g) | Cycle performance (%) |
|---|---|---|---|---|---|---|---|---|
| | $Pr_5Co_{19}$ | $Ce_5Co_{19}$ | $PuNi_3$ | $CaCu_5$ | Total | | | |
| Example 1 | 0.0 | 0.0 | 7.8 | 0.0 | 100.0 | 5.029 | 381 | 97.2 |
| Example 2 | 0.0 | 0.0 | 10.5 | 0.0 | 100.0 | 5.032 | 383 | 97.0 |
| Example 3 | 0.0 | 5.0 | 16.9 | 0.0 | 100.0 | 5.024 | 378 | 96.7 |
| Example 4 | 3.1 | 7.9 | 7.7 | 0.0 | 100.0 | 5.025 | 380 | 96.9 |
| Example 5 | 0.0 | 0.0 | 13.6 | 0.0 | 100.0 | 5.033 | 379 | 97.1 |
| Example 6 | 0.0 | 2.8 | 16.7 | 0.0 | 100.0 | 5.033 | 380 | 96.8 |
| Example 7 | 0.0 | 3.1 | 12.5 | 0.0 | 100.0 | 5.030 | 380 | 97.5 |
| Example 8 | 3.5 | 4.0 | 17.1 | 0.0 | 100.0 | 5.024 | 376 | 97.3 |
| Example 9 | 8.9 | 6.7 | 11.7 | 3.1 | 100.0 | 5.029 | 385 | 96.2 |
| Example 10 | 8.2 | 9.4 | 7.4 | 2.0 | 100.0 | 5.031 | 382 | 95.8 |
| Example 11 | 9.5 | 7.1 | 6.8 | 0.6 | 100.0 | 5.024 | 382 | 96.0 |
| Example 12 | 0.0 | 0.0 | 6.2 | 0.0 | 100.0 | 5.026 | 378 | 97.3 |
| Example 13 | 0.0 | 3.8 | 10.1 | 0.0 | 100.0 | 5.026 | 377 | 97.2 |
| Example 14 | 0.0 | 3.8 | 17.6 | 0.0 | 100.0 | 5.027 | 380 | 96.9 |
| Example 15 | 0.0 | 0.0 | 8.3 | 0.0 | 100.0 | 5.029 | 382 | 97.2 |
| Comparative Example 1 | 8.0 | 10.2 | 20.8 | 2.0 | 100.0 | 5.021 | 376 | 95.7 |
| Comparative Example 2 | 0.0 | 0.0 | 17.9 | 0.0 | 100.0 | 5.036 | 376 | 95.3 |
| Comparative Example 3 | 0.0 | 0.0 | 18.1 | 1.3 | 100.0 | 5.041 | 373 | 95.1 |
| Comparative Example 4 | 0.0 | 0.0 | 45.7 | 4.1 | 100.0 | 5.007 | 364 | 94.1 |
| Comparative Example 5 | 0.0 | 0.0 | 39.6 | 5.8 | 100.0 | 5.018 | 371 | 95.3 |
| Comparative Example 6 | 9.2 | 28.0 | 0.0 | 36.8 | 100.0 | 5.041 | 341 | 96.7 |
| Comparative Example 7 | 10.5 | 29.8 | 0.0 | 25.9 | 100.0 | 5.034 | 350 | 96.9 |
| Comparative Example 8 | 7.9 | 36.7 | 0.0 | 7.4 | 100.0 | 5.022 | 350 | 97.1 |
| Comparative Example 9 | 9.6 | 25.6 | 0.0 | 7.9 | 100.0 | 5.003 | 336 | 97.2 |
| Comparative Example 10 | 5.0 | 5.2 | 8.4 | 4.2 | 100.0 | 5.036 | 385 | 94.6 |
| Comparative Example 11 | 13.5 | 27.0 | 1.7 | 3.3 | 100.0 | 5.023 | 377 | 95.0 |
| Comparative Example 12 | 5.1 | 6.9 | 0.0 | 3.3 | 100.0 | 5.010 | 365 | 94.9 |
| Comparative Example 13 | 10.2 | 14.7 | 1.3 | 4.0 | 100.0 | 5.033 | 368 | 95.3 |
| Comparative Example 14 | 9.8 | 12.5 | 2.1 | 5.2 | 100.0 | 5.022 | 371 | 95.5 |
| Comparative Example 15 | 14.8 | 18.5 | 8.3 | 8.0 | 100.0 | 5.012 | 365 | 95.6 |
| Comparative Example 16 | 16.8 | 23.5 | 7.7 | 7.8 | 100.0 | 5.001 | 360 | 95.8 |
| Comparative Example 17 | 0.0 | 0.0 | 21.5 | 0.0 | 100.0 | 5.037 | 375 | 95.2 |
| Comparative Example 18 | 4.8 | 7.0 | 25.9 | 1.2 | 100.0 | 5.019 | 365 | 95.8 |
| Comparative Example 19 | 0.0 | 1.4 | 18.4 | 0.0 | 100.0 | 5.038 | 372 | 95.4 |
| Comparative Example 20 | 7.8 | 5.2 | 15.3 | 0.0 | 100.0 | 5.038 | 375 | 94.8 |
| Comparative Example 21 | 11.8 | 14.3 | 16.5 | 2.5 | 100.0 | 5.017 | 375 | 95.2 |

TABLE 1-continued

| | | | | | | | | |
|---|---|---|---|---|---|---|---|---|
| Comparative Example 22 | 0.0 | 0.0 | 27.9 | 56.3 | 100.0 | 5.025 | 382 | 93.6 |
| Comparative Example 23 | 0.0 | 0.0 | 14.5 | 0.0 | 100.0 | 5.007 | 368 | 95.2 |

As shown in Table 1, the hydrogen absorption alloys of the present invention (Examples 1 to 15) are found to have a high capacity retention ratio even after 10 cycles while retaining a high maximum discharge capacity.

How the capacity retention ratio changes with a relation between the content of Ca and the content of Sm was shown in the graph of FIG. 1.

From the examples and the comparative examples described above, example and comparative example with the content of Ca being 1.9 atomic %, example and comparative example with the content of Ca being 2.3 atomic %, example and comparative example with the content of Ca being 3.2 atomic %, comparative example with the content of Ca being 0 atomic %, comparative example with the content of Ca being 4.4 atomic % and comparative example with the content of Ca being 1.1 atomic % were selected (see Table 2), each of the examples and the comparative examples were plotted on a graph with Sm taken on the X axis and the capacity retention ratio taken on the Y axis.

TABLE 2

| | Ca content atomic % | Sm content atomic % | Capacity retention ratio (%) after 10 cycles | Maximum discharge capacity (mAh/g) |
|---|---|---|---|---|
| Comparative Example 19 | 1.9 | 0.7 | 95.4 | 372 |
| Example 5 | 1.9 | 1.6 | 97.1 | 379 |
| Example 7 | 1.9 | 2.3 | 97.5 | 380 |
| Example 8 | 1.9 | 3.5 | 97.3 | 376 |
| Example 13 | 1.9 | 1.9 | 97.2 | 377 |
| Comparative Example 18 | 1.9 | 4.7 | 95.8 | 365 |
| Comparative Example 3 | 2.3 | 0.0 | 95.1 | 373 |
| Comparative Example 17 | 2.3 | 0.7 | 95.2 | 375 |
| Example 6 | 2.3 | 1.6 | 96.8 | 380 |
| Example 2 | 2.3 | 1.9 | 97.0 | 383 |
| Example 1 | 2.3 | 2.3 | 97.2 | 381 |
| Example 4 | 2.3 | 3.3 | 96.9 | 380 |
| Example 3 | 2.3 | 3.5 | 96.7 | 378 |
| Comparative Example 1 | 2.3 | 4.0 | 95.7 | 376 |
| Comparative Example 5 | 2.3 | 4.7 | 95.3 | 371 |
| Comparative Example 4 | 2.3 | 7.0 | 94.1 | 364 |
| Comparative Example 20 | 3.2 | 0.5 | 94.8 | 375 |
| Example 10 | 3.2 | 1.8 | 95.8 | 382 |
| Example 9 | 3.2 | 2.3 | 96.2 | 385 |
| Example 11 | 3.2 | 3.2 | 96.0 | 382 |
| Comparative Example 21 | 3.2 | 4.6 | 95.2 | 375 |
| Comparative Example 6 | 0.0 | 0.0 | 96.7 | 341 |
| Comparative Example 7 | 0.0 | 1.5 | 96.9 | 350 |
| Comparative Example 8 | 0.0 | 4.4 | 97.1 | 350 |
| Comparative Example 9 | 0.0 | 8.7 | 97.2 | 336 |
| Comparative Example 10 | 4.4 | 0.0 | 94.6 | 385 |
| Comparative Example 11 | 4.4 | 2.2 | 95.0 | 377 |
| Comparative Example 12 | 4.4 | 4.4 | 94.9 | 365 |
| Comparative Example 13 | 1.1 | 0.0 | 95.3 | 368 |
| Comparative Example 14 | 1.1 | 2.2 | 95.5 | 371 |
| Comparative Example 15 | 1.1 | 4.4 | 95.6 | 365 |
| Comparative Example 16 | 1.1 | 6.7 | 95.8 | 360 |

It is seen from FIG. 1 that in the case where the content of Ca is 1.9, 2.3 and 3.2 atomic % and when the content of Sm is in a range of 1.6 atomic % or more and 3.5 atomic % or less, the cycle capacity retention ratio is remarkably improved.

Figure 2:
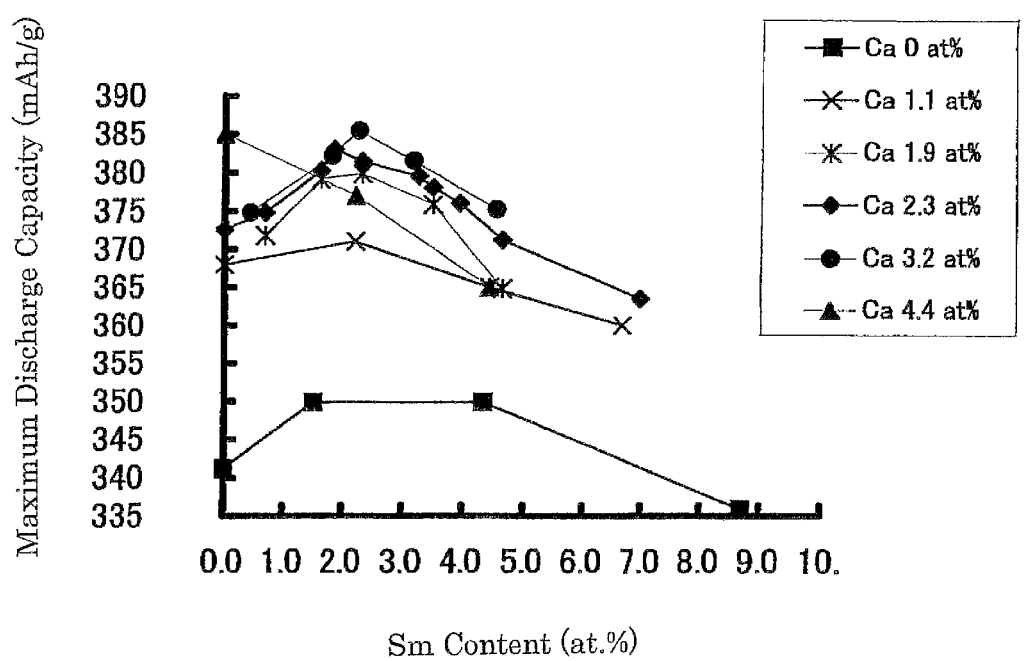
FIG. 2 is a graph showing a relation between the content ratio of Sm and the maximum discharge capacity (mAh/g) at each Ca content ratio in a hydrogen absorption alloy.

For the examples and the comparative examples in Table 2, a graph prepared by plotting the examples and the comparative examples on a graph with the amount of Sm taken on the X axis and the maximum discharge capacity mAh/g taken on the Y axis as in the case of the capacity retention ratio for how the maximum discharge capacity changes was shown in FIG. 2.

It is seen from FIG. 2 that in the case where the content of Ca is 1.9, 2.3 and 3.2 atomic %, the maximum discharge capacity is higher when the content of Sm is in a range of less than 1.6 atom % and more than 3.5 atomic %.

The invention claimed is:

1. A hydrogen absorption alloy, comprising chemical composition represented by a formula $M1_t M2_u M3_v Ca_w Mg_x Ni_y M4_z$ wherein $16\times(d-1.870)/(d-r) \leq v \leq 16\times(d-1.860)/(d-r)$;

$1.9 \leq w \leq 3.2$;

$4.1 \leq x \leq 5.1$;

$3.2 \leq (y+z)/(t+u+v+w+x) \leq 3.4$;

$t+u+v+w+x+y+z=100$;

M1 is one or more elements selected from La, Pr, and Nd;

M2 is one or more elements selected from V, Nb, Ta, Ti, Zr, and Hf;

M3 is Sm;

M4 is one or more elements selected from Co, Mn, Al, Cu, Fe, Cr, and Zn;

d is an average atomic radius of the elements selected as M1;

r is an atomic radius of Sm; and a ratio of Sm to the entire hydrogen absorption alloy is 1.6 atomic % or more and 3.5 atomic % or less.

2. The hydrogen absorption alloy according to claim 1, which is constituted such that v satisfies $0.5 \leq v \leq 3.7$.

3. The hydrogen absorption alloy according to claim 1, which is constituted such that v satisfies $1.6 \leq v \leq 3.5$.

4. The hydrogen absorption alloy according to claim 1, wherein a crystal phase having a $Ce_2Ni_7$ type crystal structure is a main generated phase.

5. A hydrogen absorption alloy electrode, comprising using the hydrogen absorption alloy according to claim 1 as a hydrogen storage medium.

6. A secondary battery, comprising using the hydrogen absorption alloy electrode according to claim 5 as a negative electrode.

7. A hydrogen absorption alloy, comprising chemical composition represented by a formula $M1_tM2_uM3_vCa_wMg_xNi_yM4_zM5_s$ wherein $16\times(d-1.870)/(d-r)\leq v\leq 16\times(d-1.860)/(d-r)$;
$1.9\leq w\leq 3.2$;
$4.1\leq x\leq 5.1$;
$3.2\leq(y+z)/(t+u+v+w+x)\leq 3.4$;
$t+u+v+w+x+y+z=100$;
s is in a range of $0<s\leq 0.4$;
M1 is one or more elements selected from La, Pr, and Nd;
M2 is one or more elements selected from V, Nb, Ta, Ti, Zr, and Hf;
M3 is Sm;
M4 is one or more elements selected from Co, Mn, Al, Cu, Fe, Cr, and Zn;
M5 is an element other than M1, M2, M3 and M4;
d is an average atomic radius of the elements selected as M1;
r is an atomic radius of Sm; and
a ratio of Sm to the entire hydrogen absorption alloy is 1.6 atomic % or more and 3.5 atomic % or less.

8. The hydrogen absorption alloy according to claim 7, which is constituted such that v satisfies $0.5\leq v\leq 3.7$.

9. The hydrogen absorption alloy according to claim 7, which is constituted such that v satisfies $1.6\leq v\leq 3.5$.

10. The hydrogen absorption alloy according to claim 7, wherein a crystal phase having a $Ce_2Ni_7$ type crystal structure is a main generated phase.

11. A hydrogen absorption alloy electrode, comprising using the hydrogen absorption alloy according to claim 7 as a hydrogen storage medium.

12. A secondary battery, comprising using the hydrogen absorption alloy electrode according to claim 11 as a negative electrode.

* * * * *